(12) United States Patent
Yahyavi

(10) Patent No.: US 9,250,796 B2
(45) Date of Patent: Feb. 2, 2016

(54) VIDEO EDITOR

(71) Applicant: IDEO LLC, Palo Alto, CA (US)

(72) Inventor: Dominique Yahyavi, Palo Alto, CA (US)

(73) Assignee: IDEO LLC, Palo Alto, CA (US)

( * ) Notice: Subject to any disclaimer, the term of this patent is extended or adjusted under 35 U.S.C. 154(b) by 14 days.

(21) Appl. No.: 14/260,107

(22) Filed: Apr. 23, 2014

(65) Prior Publication Data

US 2015/0281591 A1  Oct. 1, 2015

Related U.S. Application Data

(60) Provisional application No. 61/973,838, filed on Apr. 1, 2014.

(51) Int. Cl.
| | |
|---|---|
| H04N 5/222 | (2006.01) |
| G06F 3/0488 | (2013.01) |
| H04N 5/232 | (2006.01) |
| G06F 3/0484 | (2013.01) |
| G11B 27/00 | (2006.01) |
| H04N 5/228 | (2006.01) |

(52) U.S. Cl.
CPC ............ *G06F 3/0488* (2013.01); *G06F 3/0484* (2013.01); *G11B 27/00* (2013.01); *H04N 5/23229* (2013.01); *H04N 5/23293* (2013.01)

(58) Field of Classification Search
USPC .............. 348/333.01, 333.02, 333.11–333.12
See application file for complete search history.

(56) References Cited

U.S. PATENT DOCUMENTS

| | | | |
|---|---|---|---|
| 8,428,453 B1 | 4/2013 | Spiegel et al. | |
| 2013/0120439 A1* | 5/2013 | Harris et al. | 345/619 |
| 2013/0239056 A1* | 9/2013 | Ubillos et al. | 715/833 |
| 2013/0239057 A1* | 9/2013 | Ubillos et al. | 715/833 |
| 2013/0328906 A1* | 12/2013 | Webb et al. | 345/590 |
| 2014/0063047 A1* | 3/2014 | Johnson et al. | 345/594 |
| 2014/0176750 A1* | 6/2014 | Pajak et al. | 348/222.1 |
| 2014/0362274 A1* | 12/2014 | Christie et al. | 348/333.11 |
| 2015/0172534 A1* | 6/2015 | Miyakawa | H04N 5/23216 348/222.1 |

* cited by examiner

*Primary Examiner* — Ngoc-Yen Vu

(74) *Attorney, Agent, or Firm* — Peters Verny, LLP

(57) ABSTRACT

A video editing system includes dragging and dropping video segments within a graphical user interface. These actions are used to create a compiled video from the video segments, and are optionally performed using a touch sensitive display. Some embodiments include a filter that can be dragged across a video during presentation of the video. As the filter is dragged, a first part of the displayed video is seen with the filter applied while a second part of the displayed video is seen without application of the filter. The boundary between the first part and the second part is optionally responsive to a pointing device, such as a touch sensitive display. The video editing system may be included in a mobile device that is also configured to record the video using a camera.

7 Claims, 6 Drawing Sheets

VIDEO EDITOR

CROSS-REFERENCE TO RELATED APPLICATIONS

This application claims benefit and priority to U.S. provisional patent application Ser. No. 61/973,838 filed Apr. 1, 2014, the disclosure of which is hereby incorporated herein by reference.

BACKGROUND

1. Field of the Invention

The invention is in the field of image editing, for example editing a sequence of images within a video.

2. Related Art

Digital editing of video allows for the cutting and splicing of video content. Image editing software is used to apply filters to images. These filters can be applied at a pixel level or at an image level through parametric editing. In pixel level editing, the characteristics of individual pixels are changed. Pixel level editing occurs one image at a time, e.g., an image is opened, modified, and then modified pixel data is saved. The modification of the pixel can be destructive if the original data is not saved. In parametric editing instructions or parameters are created, which define how pixels of an image are interpreted. Because parametric editing involves a change in interpretation, it is non-destructive. Parametric editing is easily applied to batches of images, such as video.

SUMMARY

A video editing system includes a computing device configured to perform a variety of video editing functions. In some embodiments these functions include a gesture based editing system in which editing and arrangement of video sequences is accomplished by finger movement (gestures) on a touch sensitive display. In some embodiments the video editing functions include real-time application of filters controlled using gestures. These filters may be dragged over a touch sensitive display during display of a video. During the dragging of the filter, a first part of the video may be seen with the filter applied while a second part of the video is seen without the filter. A boundary between the first part and the second part is optionally responsive to the location of a touch on a touch sensitive display.

Some embodiments of the invention include a video capture system including a camera and a touch sensitive display, such as a cellular phone or a tablet computer. The video capture system is configured such that the touch sensitive display can be used for both capturing video segments and editing the captured video segments as described herein.

Various embodiments of the invention include an image editing system comprising: a display including a plurality of pixels and a touch sensitive screen; filter logic configured for applying filtering to a first part of an image on the display, the filtering configured to change the appearance of displayed pixels; selection logic configured to select the first part of the image in response to a sliding touch on the display, such that the filtering is applied to the first part of the image but not a second part of the image, a division between the first part and the second part being controlled in real time as the sliding touch is moved on the display; memory configured to store the image; and a microprocessor configured to execute at least the selection logic.

Various embodiments of the invention include a video system comprising: a camera configured to capture video segments, the video segments each including an ordered set of images; a display configured to present the captured video segments to a user, and including a touch sensitive screen; optionally sequence editing logic configured to arrange the video segments in a selected order; filter logic configured to apply a pixel level filter to the set of images, the filter being applied as the video segments are presented on the display; selection logic configured to select a first part of the images in response to a touch on the display, such that the filter is applied to the first part of the images but not to a second part of the images, a division between the first part and the second part being controlled in real time by the touch on the display; memory configured to store the set of images as modified by the filter logic; and a microprocessor configured to execute at least the selection logic.

Various embodiments of the invention include video editing system comprising: a display including a plurality of pixels; video representation logic configured to generate a representation of a video segment, the representation being configured for presentation on the display and including a curvilinear object representative of the video segment as a function of time, the curvilinear object being displayed in a two dimensional space; video selection logic configured to receive a selection of a part of the video segment, the selection being based on positions of a start marker and an end marker on the curvilinear object and resulting in a selected video segment; video modification logic configured to receive a modification of the selected video segment, the modification being responsive to movement of the curvilinear object within the two dimensional space; memory configured to store the selected video segment; and a microprocessor configured to execute at least the video modification logic.

Various embodiments of the invention include a method of applying a filter to video, the method comprising: displaying an image on a touch sensitive screen the image including a plurality of pixels and being one of a plurality of images in an image sequence that form a video segment; detecting a first sliding touch on the touch sensitive screen; applying a filter to a first part of the image in response to the first sliding touch, the filtering being applied to the first part of the image but not to a second part of the image, a division between the first part and the second part being controlled in real time as the first sliding touch is moved on the display, the filter being applied as the image is being displayed on the touch sensitive screen as part of the video segment. These embodiments may further comprising changing a location of the division between the first part and the second part responsive to the first sliding finger touch, changing the filter to a second filter responsive to detection of a second sliding touch, and/or applying the second filter to the first part of the image while the first filter is applied to the second part of the image, the division between the first part and the second part of the image being changed in real-time in response to a position of the second sliding touch on the display. Various embodiments of the invention include logic configured to perform the method steps disclosed herein, the logic being stored as software on a non-volatile computer readable medium.

DETAILED DESCRIPTION

Figure 1:
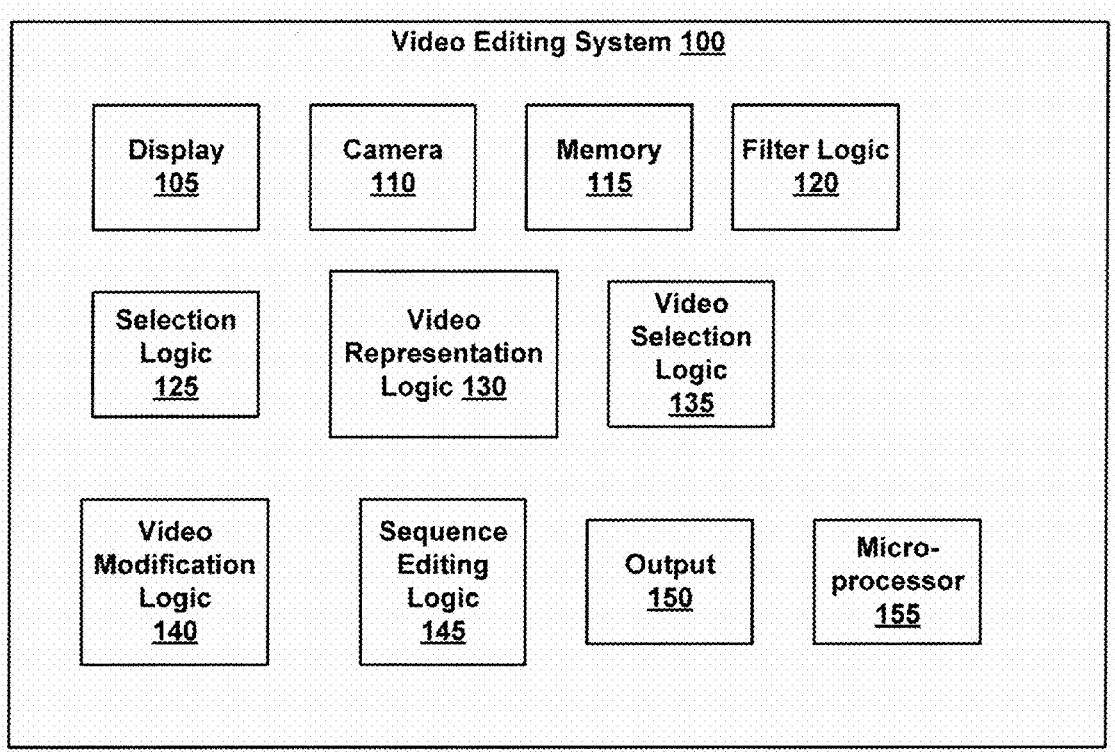
FIG. 1 illustrates a video editing system, according to various embodiments of the invention.

The video editing system of the invention is typically embodied in a computing device that includes a camera and/or other functions. For example, one embodiment is represented by the "Spark" application available from the Apple® store. This application can be installed on a smartphone or tablet computer to perform some of the functions described herein. FIG. 1 illustrates a Video Editing System 100, according to various embodiments of the invention. Video Editing System 100 can include a smartphone, mobile computing device, table computer, laptop computer, and/or the like. In these embodiments, Video Editing System 100 typically includes logic used to configure the included device for the specific purposes described herein.

Video Editing System 100 includes a Display 105 including a plurality of pixels. In various embodiments, Display 105 includes a touch sensitive screen and/or is configured to support a cursor controlled by a pointing device. Display 105 may be part of a smartphone, tablet computer, wearable device (e.g., glasses), and/or eye projection device. Display 105 is optionally part of a semi-transparent device.

Video Editing System 100 optionally further includes a Camera 110. Camera 110 is configured to capture still images and/or sequences of images that form a video. Images captured using Camera 110 are typically stored in a Memory 115 of Video Editing System 100. Memory 115 includes, for example, digital read only memory, digital random access memory, flash memory, static memory, and/or the like. Memory 115 may also be configured to store logic of Video Editing System 100 in the form of software and/or firmware. Memory 115 is also, typically, configured to store modified or edited versions of video captured using Camera 110 and/or video received by Video Editing System 100 from external devices. Memory 115 is optionally further configured to store filter information representative of a plurality of image filters. This filter information may apply to pixel and/or image based filtering and includes, for example, rules for how each filter is applied to pixels, rules for how image data should be displayed through a filter, and/or the like. Memory 115 is configured to store the data and information discussed herein via appropriate data and file structures, indexing, memory allocation, access routines, and/or the like.

Video Editing System 100 further includes Filter Logic 120. Filter Logic 120 is configured to apply one or more filters to image data presented on Display 105. The filtering performed by Filter Logic 120 can be pixel level filtering and/or image level filtering. The filtering may also be destructive or non-destructive. In an exemplary embodiment, Filter Logic 120 is configured to apply a pixel level filtering in which the RBG (red-green-blue) values of a pixel are shifted. Other examples of filters that may be applied by Filter Logic 120 include a color transform, a blur, a motion blur, a find edges filter, a sharpen filter, and emboss filter, a mean and median filter, a threshold filter, a curve filter, a saturation filter, a multi-pixel filter, and/or any other image filter.

Filter Logic 120 is configured for applying a filter to part or parts of an image as the image is shown on Display 105. The filtering is configured to change the appearance of displayed pixels. Filter Logic 120 may apply a filter to a first part of an image but not to a second part. Further, Filter Logic 120 is optionally configured to apply filters to more than one part of an image. For example, a first filter may be applied to a first part of an image, while a second, optionally different, filter is applied to a second part of the image. The first and second parts of the image may overlap or may be distinct. If they are distinct, they may be separated by a third part or by a division such as a line or curve. When the filters overlap, some pixels are modified by both filters. In some embodiments, more than two filters are applied to an image, in any combination of overlapping or distinct parts.

Filter Logic 120 is configured to apply one or more filters to an image as the image is being shown on Display 105. In some embodiments, Filter Logic 120 is configured to apply one or more filters in real-time as the image is displayed as part of sequence of images that form a video. For embodiments, the one or more filters are automatically applied to multiple images in the sequence. For example, one or more filters may be applied to the same set of pixel positions in each of the images of the sequence. Alternatively, one or more filters may be applied to different pixel positions, specified by a user, as a sequence of images is displayed. The application of filters occurs in real-time, e.g., at least as fast as the images are being displayed on Display 105.

In some embodiments, Filter Logic 120 is configured to apply the one or more filters to a sequence of images as the images are being captured by Camera 110. In these embodiments the filters are applied to the images such that the images are first displayed with the filters applied. If Display 105 is used as the view finder of Camera 110, then the image as seen in the view finder may have the filter applied.

Filter Logic 120 includes hardware, firmware and/or software stored on a non-volatile medium. Filter Logic 120 is optionally configured to utilize filter information stored in Memory 115. For example, Filter Logic 120 may be configured to retrieve filter information related to a specific filter from memory 115. In addition to a filter identifier, the filter information may include, for example parameters and rules for modification of pixels, rules for interpretation of pixel data, and/or the like. In some embodiments Filter Logic 120 is configured to apply a filter responsive to a filter scaling factor. The filter scaling factor is configured to control the strength of a filter. For example, if a filter is configured to modify pixels by making them more red, the filter scaling factor may be varied to control how much more red the pixels are made.

In various embodiments, Filter Logic 120 is configured to store modified pixels in Memory 115 and/or to store original (unmodified) pixels in Memory 115. Original pixels are optionally stored in association with filter information configured to control and/or modify the display of the original pixels. In some embodiments, Filter Logic 120 is configured to first receive filter information as filters are selected and/or modified by a user and, after the selection and/or modification has been completed for a video sequence, to apply the selected and/or modifications to the image data in a destructive manner. As such, filters may be first applied in a non-destructive manner during an editing process and then destructively applied when editing is complete.

Video Editing System 100 further includes Selection Logic 125. Selection Logic 125 is configured for selecting which of a plurality of alternative filters to apply to images using Filter Logic 120, and Selection Logic 125 is also configured which part or parts of an image the filter or filters should be applied. Optionally, Selection Logic 125 is configured to make both of these selections responsive to a sliding touch on Display 105.

In one example, Selection Logic 125 is configured to select a first part of an image such that a first filter is applied to the first part but not to a second part of the image. This is accomplished by detection of a sliding touch on the touch sensitive screen of Display 105 and applying the first filter to a part of the image that is covered or indicated by the sliding touch. A sliding touch may be accomplished by touching the touch sensitive screen at a first point and then sliding a finger across the screen to a second point, without breaking contact with the screen. A similar input may be achieved by dragging a cursor across a display while holding a key or button down.

Selection Logic 125 first receives touch coordinates from the touch sensitive screen. If these coordinates are in a region that has been designated as a possible starting place for a sliding touch, e.g., the right or left (or top or bottom) of the screen, then Selection Logic 125 will interpret movement of that touch toward the center of the screen as a command to apply a filter. In various embodiments, the position of the sliding touch is interpreted, in real-time, as an indication of which part of the image the filter is to be applied. As such, as the touch (e.g., finger) is moved across the image the area to which the filter is applied is expanded. The size of the area is proportional to the length of the touch movement. Optionally, the position of the touch is used to determine a division between a first part of the image to which the filter is applied and a second part of the image to which the filter is not applied. This creates a desirable appearance that the filter is being dragged over the image. In some embodiments, the application of the filter lags behind the touch position slightly as the touch is moved. The part of the image to which the filter is applied may be fixed by halting the sliding motion and/or lifting the touch from the screen. In some embodiments, the part of the image to which the filter is applied may be reduced by reversing the direction of the sliding motion.

In embodiments wherein more than one filter is simultaneously applied to the same pixels, the part of the image to which a first filter is applied is controlled by a horizontal sliding motion and the part of the image to which a second filter is applied is controlled by a vertical sliding motion.

Selection Logic 125 is configured to operate, as describe herein, on either video or individual images. When operating on video, which includes a sequence of images, the part of each image to which a filter or filters is applied to is optionally automatically maintained between images. For examples, if a set of pixels fall within the part of the image to which a filter is applied in a first image, the same corresponding pixels in the next image in sequence will have the same filter automatically. As such, the filter is applied to the same region within the video as multiple images are shown. The part of each image to which the filter is applied is selectable and changeable using the touch sensitive screen as described elsewhere herein. In some embodiments, the set of pixels to which a filter is applied may be changed under user control, as the video is displayed. For Example, a user may move the location and/or change the size of a filter as images within the video sequence are displayed. In these processes, pixel level filtering is automatically applied to each image in a video. The filtering may be destructive. Alternatively, if not destructive the regions within the video (parts of each image) to which the filter is applied, and which filters are applied, is optionally stored with the video in Memory 115 such that the filtering can be reproduced when the video is played back. Filtering that is initially non-destructive may later be applied in a destructive manner.

The division between a first part of an image in which a filter is applied and a second part of the image to which the filter is not applied can be controlled as described herein. The division may be dynamically controlled (e.g., moved) responsive to a touch on Display 105 during presentation of a video. The division may be a horizontal or vertical line, or a line perpendicular to the direction of the sliding touch that controls the location of the division. For example, if the sliding touch is at an angle of roughly 45 degrees from on corner of Display 105 toward an opposite corner of Display 105, then the division may be a line perpendicular to the sweeping touch. In some embodiments, the division is a curved line and/or an enclosed volume. The curvature of the line is optionally control by the speed of the controlling sliding touch. The position, shape and size of an enclosed volume are also optionally controlled using a touch and/or touches on Display 105 as a still image or video is displayed. In some embodiments, Selection Logic 125 is configured to rotate the division responsive to a two point touch on display 105 or a curved sliding touch on Display 105.

As noted, Selection Logic 125 is also configured to select from among a plurality of different filters. Each of these filters may be applied to one or more parts of an image in series or in parallel. For example, one filter may be applied to a first part of the image or video while a second filter is applied to a second part of the image or video at the same time. Further, one filter may be applied to region in a video and later in the video a second filter may be applied to at least part of the region. Thus, some images in the video receive a first filter while other images in the same video receive one or more other filters. The filters can be changed (selected) as the video is being presented on Display 105 in real-time.

In some embodiments, selection of different filters is accomplished by making a sliding touch across most of Display 105. For example, if a first filter is already applied to an image, a second filter may be applied to the image by making a sliding touch from one side of Display 105 to another side. Typically, if the sliding touch is along the same axis and direction as the sliding touch used to select the first filter, then the second filter replaces the first filter. As the sliding touch is made a first part of the image will be displayed with the first filter and a second part of the image will be displayed with the second filter. A division between the first and second parts is controllable by position of a touch as described elsewhere herein. Optionally, if the second filter is along a different axis, e.g. vertical v. horizontal or at 45 degrees, then the second filter is added to the first filter and both are applied to the image (video) at the same time. In some embodiments, a sliding touch in one direction is used to select a first filter type and a sliding touch in another direction is used to select a second filter type. For example a horizontal sliding touch may be used to select between gray scale filters and a vertical sliding touch may be used to select between edge detection filters or color shifting filters, etc. In some embodiments, a sliding touch in a first direction is used to select a filter and a sliding touch in a second direction is used to control strength or other characteristic of the filter.

The filters can be selected by repeatedly making sliding touches to Display 105; each completed sliding touch resulting in selection of a different filter. Where the selection of one filter replaces another, the selection optionally cycles through a limited list of filters. Thus, six sliding touches to the right may be used to cycle though 5 alternative filters and no filter at all. Sliding touches in the opposite direction may be used to cycle through the filters in the opposite order or cycle through a different set of filters. In some embodiments a sliding touch in one direction is used to select filters of a first type and a sliding touch in a second direction is used to select filters of a second type.

Selection Logic 125 is configured to detect the various sliding touches discussed herein and make the corresponding filter selections. Once a filter is selected, it is applied to individual images or a sequence of images in a video using Filter Logic 120. The filter selections are saved in Memory 115 or as destructive changes to pixels, such that the images or video can be repeatedly viewed with the filters applied.

Figure 2A:
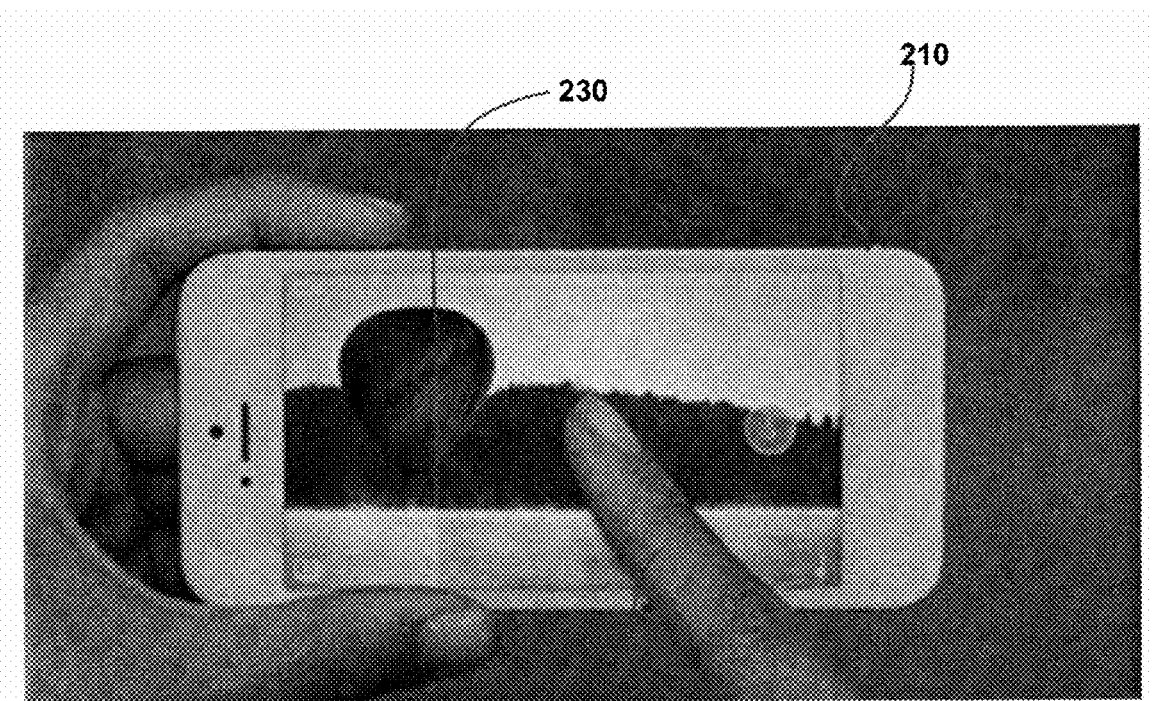
FIGS. 2A-2B illustrates a video editing interface, according to various embodiments of the invention.
Figure 2B:
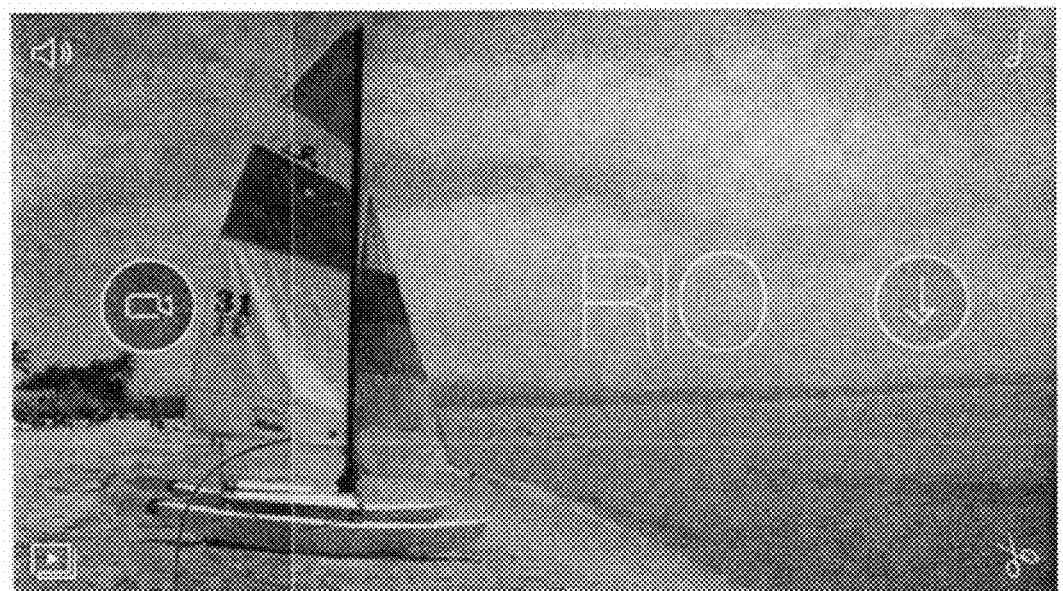

FIGS. 2A-2B illustrates a video editing interface, according to various embodiments of the invention. The example shown is an iPhone 210 including Display 105. An image including a balloon is shown. This image is optionally one of a sequence of images that comprise a video. The image is shown while a sliding touch is applied to the touch sensitive screen. Following the point of contact of the moving Finger 220, a vertical Dividing Line 230 represents a division between a first part of the image on which a color enhancement filter has been applied and a second part of the image on which a gray scale filter is applied. As the finger is slid to the right, the color enhancement filter appears to be drawn over the image. Selection Logic 125 moves the Dividing Line 230 in response to movement of the Finger 220. When the Dividing Line 230 is in the middle of the display one half of the image will be shown subject to the gray scale filter and one half of the image will be shown subject to the color enhancement filter. Showing the two filters side-by-side allows a user to compare the respective filter affects. The speed at which Dividing Line 230 moves is optionally proportional to a speed at which Finger 220 is slid across Display 105.

The image shown in FIG. 2A is captured as the Finger 220 is dragged across the Display 105 from left to right. The Dividing Line 230 follows the Finger 220. As the Finger 220 reaches the right edge of Display 105 the filter shown on the left in FIG. 2A will be cover the entire image. In some embodiments, the sliding of Finger 220 need not start or end on the very edges of Display 105. For example, in various embodiments, Finger 220 may be slid over part, e.g., at least 50%, 75% or 80%, of Display 105 to apply a filter to the entire image.

The video is optionally playing on Display 105, and thus the images changing, as the Dividing Line 230 is being moved by Finger 220 on Display 105. Movement of Dividing Line 230 causes Filter Logic 120 to automatically apply the respective filters on each side of Dividing Line 230 to each image in the image sequence of the video as it is displayed. When replayed, the same movement of the filter, as a function of progress through the image sequence, is optionally presented.

In FIG. 2B an instance of Dividing Line 230 is illustrated between a region of a video image in which a gray scale filter is applied and a region of the video image in which original pixels are shown. This image with side-by-side filtering is achieved by lifting Finger 220 from the Display 105 part way across Display 105.

Referring again to FIG. 1, Video Editing System 100 optionally further includes Video Representation Logic 130. Video Representation Logic 130 is configured to generate a representation of a video segment for presentation on Display 105. The representation includes a curvilinear object (See FIG. 4) representative of the video segment as a function of time, the curvilinear object being displayed in a two dimensional space. As used herein the term "curvilinear" means forming or moving in a curved line.

Video Editing System 100 optionally further includes Video Selection Logic 135 configured to receive a selection of a part of a video segment represented in Display 105, for example by a representation generated by Video Representation Logic 130. In some embodiments, the selection is based on positions of a start marker and an end marker on the curvilinear object. These markers may be moved to different positions on the curvilinear object to select the starting and ending positions of a subset of the video segment. The selected subset is a selected video segment that can be manipulated further. For example, in some embodiments multiple video segments can be represented on Display 105 and a subset of each selected using Video Selection Logic 135. The plurality of selected video segments that result can then be reordered and spliced together to form a new, combined, video. Filter Logic 120 may be applied to the selected video segments and/or to the new video. The movement of the start and end markers, and the reordering of the selected video segments can be accomplished by dragging the respective objects on Display 105. In some embodiments this is accomplished using a touch sensitive screen of Display 105.

Video Editing System 100 optionally further includes Video Modification Logic 140 configured to receive and make a modification of the represented video or the selected video segment resulting from manipulation of the start and end markers. This modification is typically responsive to movement of the curvilinear object, generated by Video Representation Logic 130, within the two dimensional space. The modification of the selected video segment can include one or more of an audio volume change, filter intensity, filter strength, video presentation speed and pixel distortion.

In one exemplary embodiment, the modification is a change of audio volume of a video and the modification is received by a change in radius of the curvilinear object. In another exemplary embodiment, the speed (e.g., frames per second) at which video is presented on display is increased or reduced by changing the radius of the curvilinear object. The radius of the curvilinear object may be stretched or reduced by stretching or pinching two touch points on Display 105, resulting in a corresponding change in audio volume level or video speed, etc.

In various embodiments, the video modification logic is configured to perform a first type of modification responsive to movement of the curvilinear object along a first axis and to perform a second type of modification responsive to movement of the curvilinear object along a second axis. For example, a scaling of a first filter may be controlled by expanding the curvilinear object in the vertical axis and a scaling of a second filter may be controlled by expanding the curvilinear object in the horizontal axis. Such expanding (or reducing) would result in an oval. In some embodiments, Video Modification Logic 140 is configured to modify a video in response to a change in radius of the representation of the video segment. For example, expanding the radius of the representation may be used to increase volume, increase the scaling of a filter, increase speed (frames per second) of video, and/or the like. Radius changes in different directions may be used cause Video Modification Logic 140 to change different characteristics of the video and/or filtering. Likewise, changing a center of the representation may be used to change different characteristics of the video and/or filtering. Other characteristics of video may be changed using Video Modification Logic 140 using these approaches.

Video Editing System 100 optionally further includes Sequence Editing Logic 145 configured to arrange complete video segments and/or selected video segments generated by Video Selection Logic 135 in a desired order. This is accomplished by moving a series of representation of the video segments on Display 105. Once arrange in a desired order Sequence Editing Logic 145 is configured to splice the video segments together to form a new video. The video segments may be modified, as described herein, using Filter Logic 120 and Selection Logic 125 prior to and/or after being spliced together. Filtering optionally automatically continues between video segments that have been spliced together.

Video Editing System 100 optionally further includes an Output 150 configured to export images and/or video to external devices. The exported images and/or video are optionally exported in association with filter information such that the images and/or video can be viewed with selected filter(s) applied. Output 150 may be wired or wireless. In some embodiments Output 150 is configured to export the images and/or video to an external website configured for sharing of the exported material. Output 150 is optionally configured to communicate via FTP or TCP/IP protocols. Output 150 may include a radio, or a serial or Ethernet port.

In some embodiments, Output 150 is configured to place a video in a package that prevents the video from being displayed more than once. This package is executable on a device receiving the packaged video. For example, a video sequence may be placed in a package that automatically deletes each frame of the video once the frame has been provided to a display. Such a package is known in the art for still images. Embodiments of the current invention extend such packages to image sequences that form a video. In addition, in some embodiments, a package is configured such that a video is displayed one time without a filter and the application executing the package then automatically applies the filter to the video in a destructive manner such that subsequent viewing of the video includes the effect of the filter. In some embodiments, a package is configured such that an image is displayed one time without a filter and the application executing the package then automatically applies the filter to the image in a destructive manner such that further viewing of the image includes the effect of the filter. The filter may be automatically applied to the video and/or image after a specified time delay. In some embodiments, the strength of a filter is increased each time a video or image is provided to a display. For example, a blurring filter may be progressively applied to a video or image for the first 10 showings of the video, at which time the images of the video are highly blurred. The video or image may be viewed further, but at a substantially reduced clarity and/or greatly modified. The filtering may result in an unrecognizable image.

Video Editing System 100 further includes a Microprocessor 155 configured to execute at least the Selection Logic 125. Camera 110 is optionally also responsive to Microprocessor 155. Microprocessor 155 is configured for the specific purposes taught herein through programming of data and command registers, installation of firmware, or addition of logic hardware. Microprocessor 155 may also be responsive to sensors within Video Editing System 100. In some embodiments, Microprocessor 155 is the microprocessor of a smartphone, wearable computer, tablet computer, and/or the like.

Figures 3, 9:
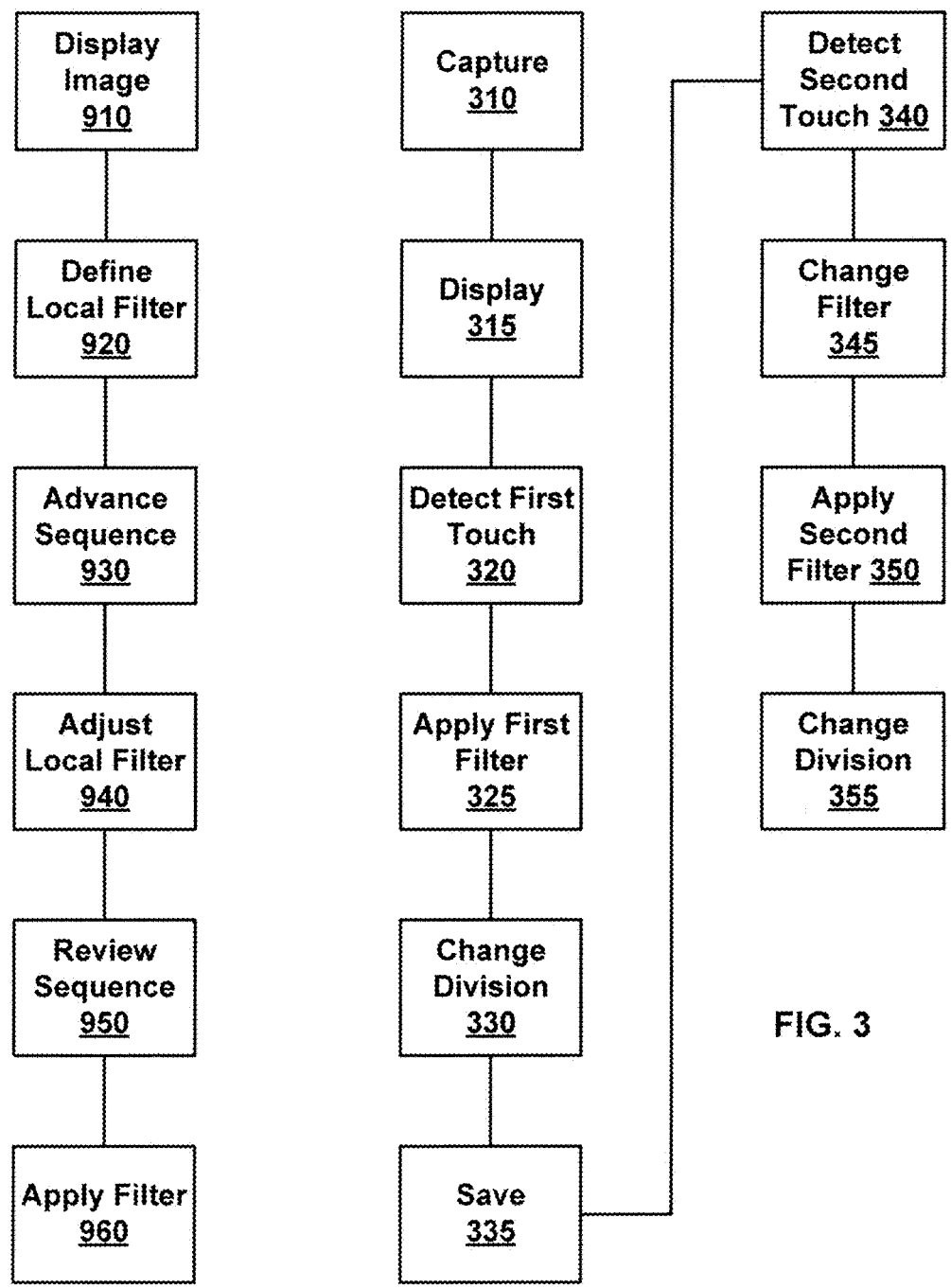
FIG. 3 illustrates a method of applying filters to image data, according to various embodiments of the invention.
FIG. 9 illustrates a method of applying a localized filter to a video segment, according to various embodiments of the invention.

FIG. 3 illustrates a method of applying filters to image data, according to various embodiments of the invention. The methods illustrated by FIG. 3 include an optional Capture Step 310 in which a video segment is captured using Camera 110. Capture Step 310 is optional in embodiments in which the video is received from an external source. The captured video may be stored in Memory 115 as it is captured. In some embodiments, the additional steps illustrated in FIG. 3 are performed in real-time as the video is captured.

In a Display Step 315 the video is displayed on Display 105. The video is displayed as a series of images in an image sequence that forms a video segment. Each image in the sequence is shown as a plurality of pixels on the touch sensitive screen of Display 105. The video is optionally displayed as it is captured using Camera 110.

In a Detect First Touch Step 320 a first sliding touch is detected on the touch sensitive screen and characteristics of the touch are provided to Selection Logic 125. The first sliding touch may be in any of a variety of different directions, Selection Logic 125 being optionally configured to respond to sliding touches in different directions in different ways. For example, the direction of the first sliding touch may be used to determine a type of filter that will be applied using Filter Logic 120.

In an Apply First Filter Step 325 a filter is applied to the image(s) of the displayed video using Filter Logic. 120. The filter is applied to a first part of the image(s) in response to the first sliding touch, the filter being applied to the first part of the image(s) but not to a second part of the image(s). The filter may be destructive or non-destructive. The filter may be applied to all or part of the image(s). For example if the first sliding touch detected in Detect First Touch Step 320 extends only partway across the image(s) then the filter will only be applied to the part of the image covered by the first sliding touch. If the first sliding touch extends all the way, or at least a predefined threshold distance across the image(s), then the filter is applied to all of the image(s).

In a Change Division Step 330 a division between the first part of the image(s) (on which the filter is applied) and the second part of the images(s) (on which the filter is not applied) is controlled using Selection Logic 125. This control is optionally in real-time as the first sliding touch is moved on the display, the filter being applied as the image(s) are displayed on the touch sensitive screen as part of the video segment. The part of the image(s) to which the filter is applied is automatically changed as the division is moved. The movement of the division optionally lags behind the moving touch point of the sliding touch. An angle of the division is optionally controlled by the direction of the first sliding touch.

In an optional Save Step 335, the images are saved in Memory 115 as a video sequence modified by the first filter, or as the original video sequence saved in association with filter information. The filter information being configured to recreate the filtering when the video sequence is displayed.

In an optional Detect Second Touch Step 340 a second sliding touch is detected on the touch sensitive screen of Display 105. Note that the image sequence may have progressed between a time that Detect First Touch Step 320 occurs and a time that Detect Second Touch Step 340 occurs. The images that are displayed during this progression typically have the first filter applied as set during Apply First Filter Step 325.

In an optional Change Filter Step 345 a second filter is selected, using Selection Logic 125, responsive to the second sliding touch. The second filter may be part of a sequence of filters that can be cycled through using repeated sliding touches. This sequence may be different than that from which the first filter is selected.

In an Apply Second Filter Step 350 the second filter is applied to a first part of the image while the first filter is applied to a second part of the image. These first and second parts may be different than the first and second parts referred to in Apply First Filter Step 325. Specifically, the position of the division or divisions bounding the first and/or second parts may change responsive to movement of the second sliding touch. Further, the second sliding touch may be at a different angle or a different direction than the first sliding touch. In this case the first and second parts of the image may overlap. The second filter is optionally a different type of filter than the first filter.

In a Change Division Step 355 the division between the first part and the second part of the image is changed in real-time in response to a position of the second sliding touch on the display. Or, a division bounding the second part is changed in embodiments where the first and second parts overlap. These changes are controlled by a position of the touch during the second sliding touch.

Figure 4:
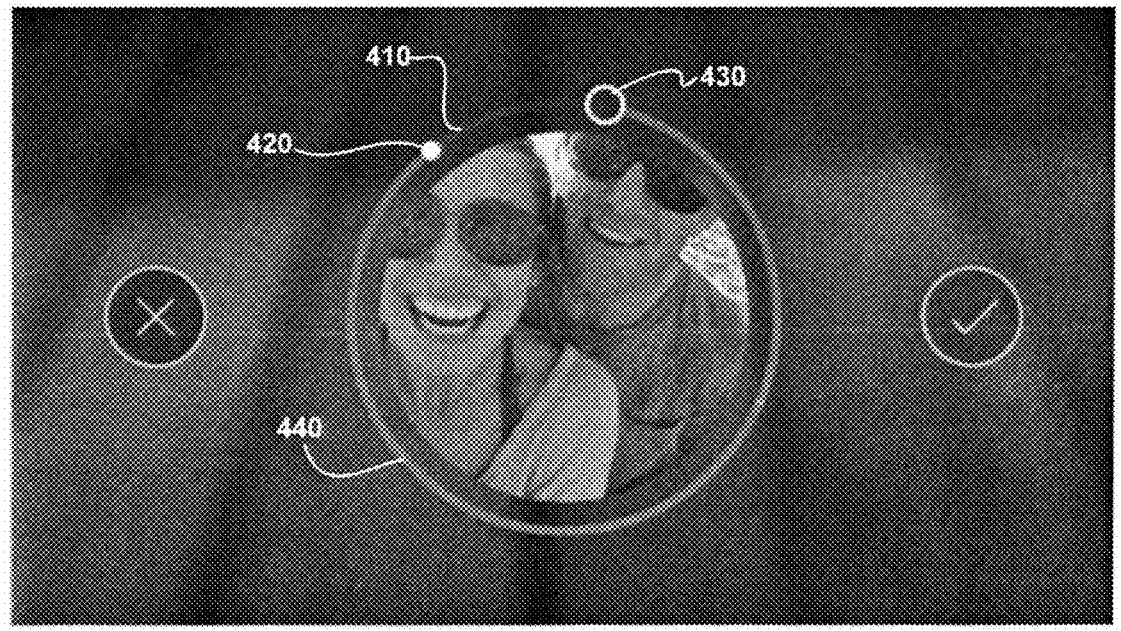
FIG. 4 illustrates a curvilinear representation of a video segment as generated using video representation logic.

FIG. 4 illustrates a curvilinear representation of a video segment as generated using video representation logic. In this representative the chronological progression of the video sequence is represented by a curvilinear Object 410, e.g., a circle, and an image from the sequence is shown inside the circle. A Start Marker 430 and a Stop Marker 420 are represented by open and closed white circles respectively. These markers can be moved by touching them and moving to different positions on the circle—using a cursor or a touch sensitive screen of Display 105. A Selected Part 440 of the video sequence is illustrated in red. In some embodiments, the image shown inside the circle is an image in the sequence, at the time of the Start Marker 430 or at the time of the Stop Marker 420. Modifying or moving the red or white circle, such as changing its radius or position, is optionally used to modify the video segment as described elsewhere herein.

Figure 5A:
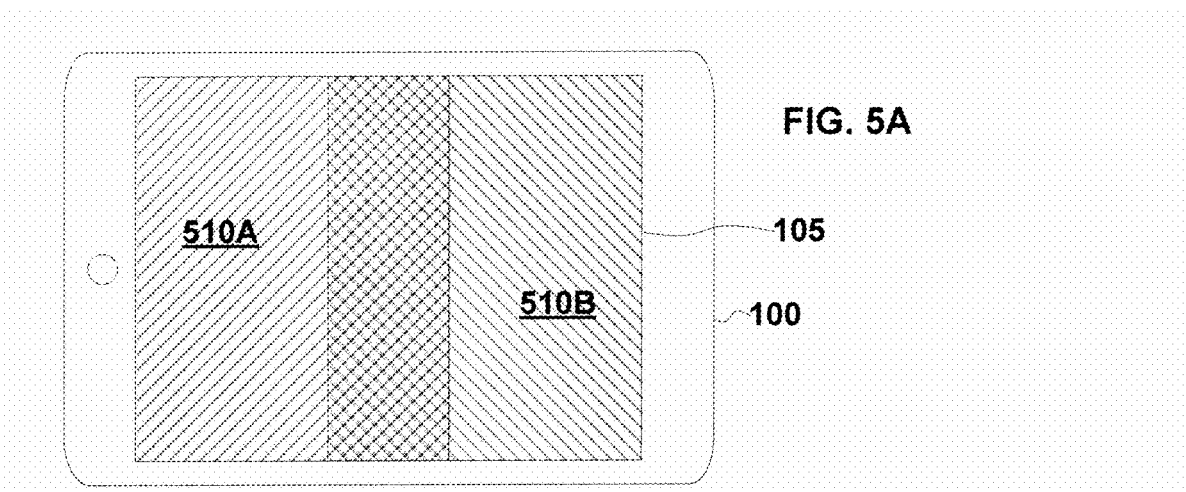
FIGS. 5A and 5B illustrate the application of multiple filters to image data, according to various embodiments of the invention.
Figure 5B:
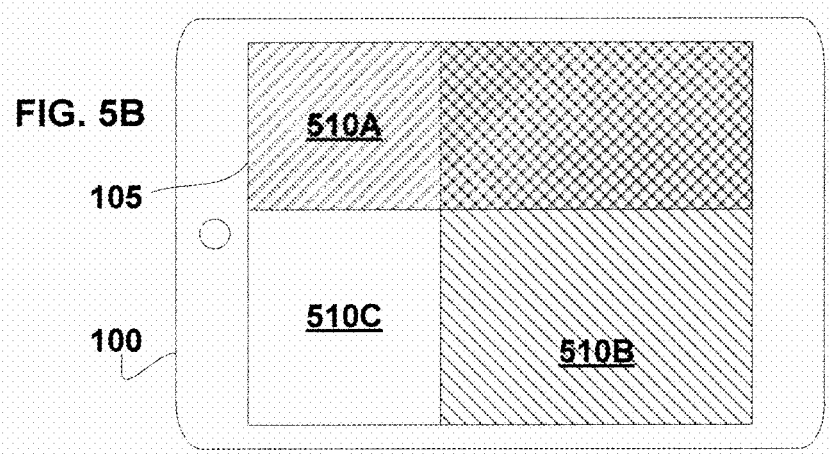

FIGS. 5A and 5B illustrate the application of multiple filters to image data, according to various embodiments of the invention. These figures show an example of Video Editing System 100 having Display 105, in the form of a smart phone or tablet computer. In FIG. 5A, within Display 105 two Filters 510A and 510B are represented by right and left cross-hatching. For clarity, an underlying image is not shown in FIGS. 5A-8C. The Filter 510A may be dragged from the left side of Display 105 and the Filter 510B may be dragged from the right side of Display 105. Note that there is a region in the center of Display 105 in which both Filter 510A and 510B are applied. In the state shown in FIG. 5A a first part of the underlying image has a first filter applied, a second part of the underlying image has a second filter applied and a third part of the underlying image has both the first and second filters applied.

FIG. 5B illustrates an embodiment in which Filter 510A is applied from the top of Display 105 and Filter 510B is applied from the right side of Display 105. As in FIG. 5A there are regions of the underlying image to which one of the filters is applied and a region in which both filters are applied. In FIG. 5B there is also a Region 510C in which neither filter is applied.

FIGS. 5A and 5B illustrate but two examples of how filters can be applied from different directions within Display 105. In other embodiments, filters can be dragged from the top, bottom, right, left, any of the corners, and/or any combination thereof. While the illustrated example show two filters, three, four or more filters may be applied to an image, in series or in parallel. In some embodiments, an area, such as Region 510C, is left with no filter applied.

The selection of parts of an image by dragging from different directions can be used to select parts of the image to which filters are applied or to which filters are not applied. For example, the application of multiple filters by dragging from different directions can be used include a selection in which "no filter" is selected from a specific direction. In some embodiments, a filter can be applied over an entire image from a first direction and then parts of that filter can be removed using finger swipes from one or two other directions. This may result in an area, such as Region 510C, having a filter and other areas of the image not being filtered. (The reverse of the state illustrated in FIG. 5B.) In other embodiments, any filtering is only applied in an area where two or more selections overlap. In these embodiments only the areas having both right and left hatching in FIGS. 5A and 5B would include filtering. Selection Logic 125 is optionally configured to generate a settings menu that allows a user to modify the logic used to control how filters are applied in response to user selections on Display 105.

Figure 6A:
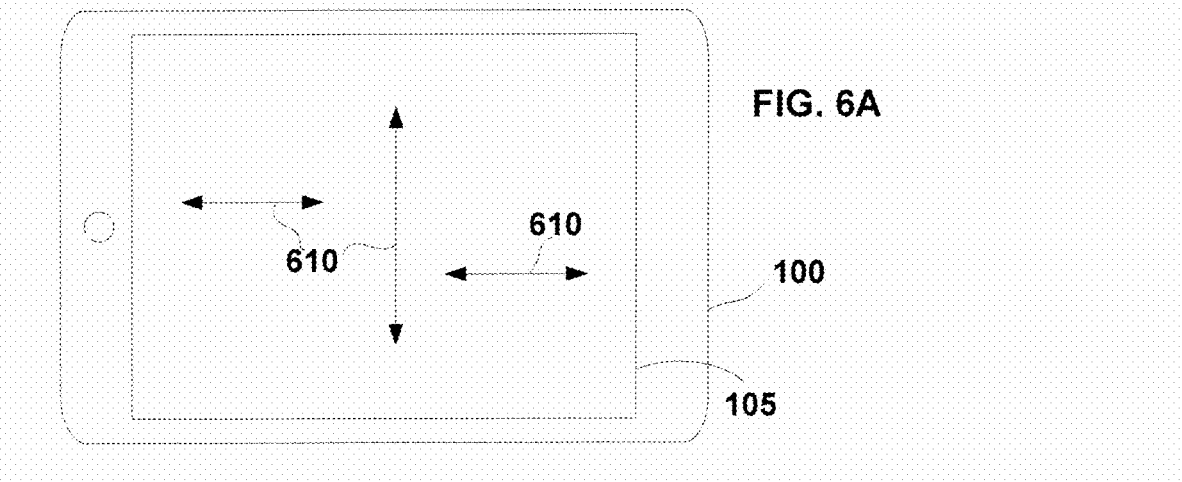
FIGS. 6A and 6B illustrate strokes that may be used to apply and modify filters, according to various embodiments of the invention.
Figure 6B:
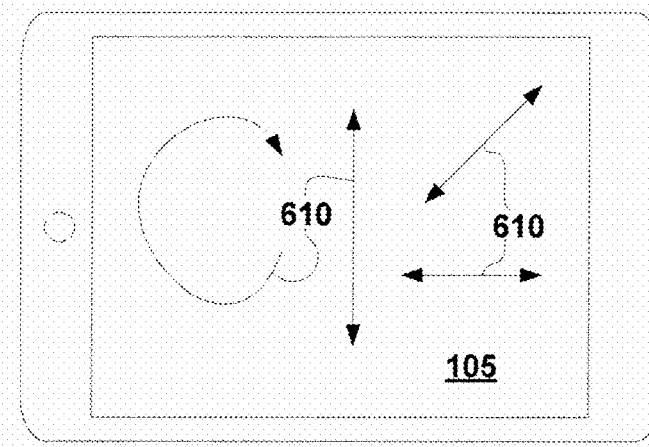

FIGS. 6A and 6B illustrate a variety of different Finger Swipes 610 that can be used to select or modify filters. These Finger Swipes 610 include moving Finger 220 across the touch sensitive screen of Display 105. The lengths of Fingers Swipes 610 may be greater or less than is illustrated in FIGS. 6A and 6B. As discussed elsewhere herein, Finger Swipes 610 in different directions may be used to modify existing filters, (e.g., change their strength or some other parameter characterizing the filter), to select filters of different types, to remove filters, and/or to select between filters. FIG. 6B illustrates a curved example of Finger Swipes 610. Such a Finger Swipe 610 may be used to rotate an image, rotate orientation of filters, change the strength or other parameter characterizing a filter, change the presentation rate (displayed frame rate) of a video, zoom images of a video in or out, and/or the like. Optionally, curved Finger Swipes 610 have opposite effects in clockwise and counter-clockwise directions.

Figure 7A:
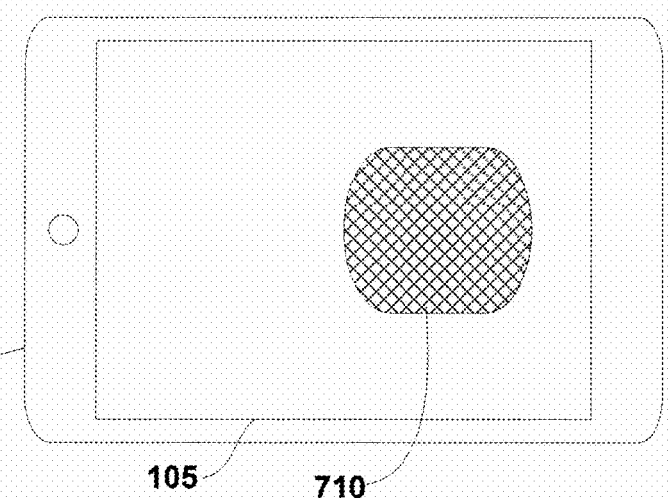
FIGS. 7A and 7B illustrate localized filters according to various embodiments of the invention.
Figure 7B:
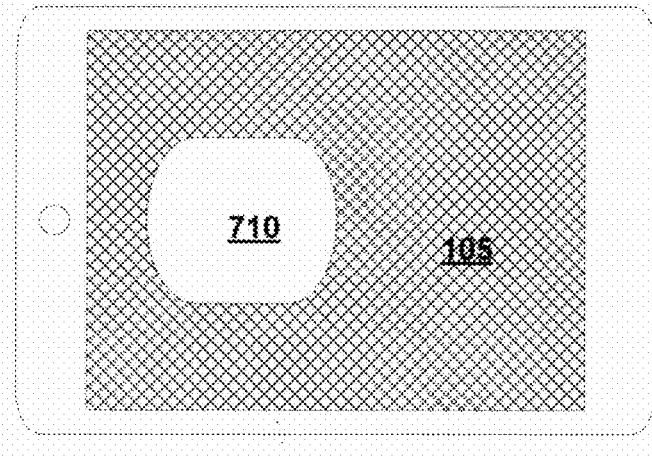

FIGS. 7A and 7B illustrate Localized Filters 710 according to various embodiments of the invention. A Localized Filters 710 is a filter that does not necessarily contact the edges of an image. A Localized Filters 710 may be selected using a circular swiping motion, a rubbing motion, by dragging from three or four edges of an image to specify a region, using a (two touch) pinching or stretching motion, and/or the like. The Localized Filters 710 can include a filter applied to an image on Display 105 as illustrated in FIG. 7A, or may include a region in which no filtering occurs as in FIG. 7B. Localized Filters 710 can be used, selected and otherwise manipulated and applied in manners similar to the non-localized filters discussed herein. Localized Filters 710 may have a wide variety of shapes and sizes.

Figure 8A:
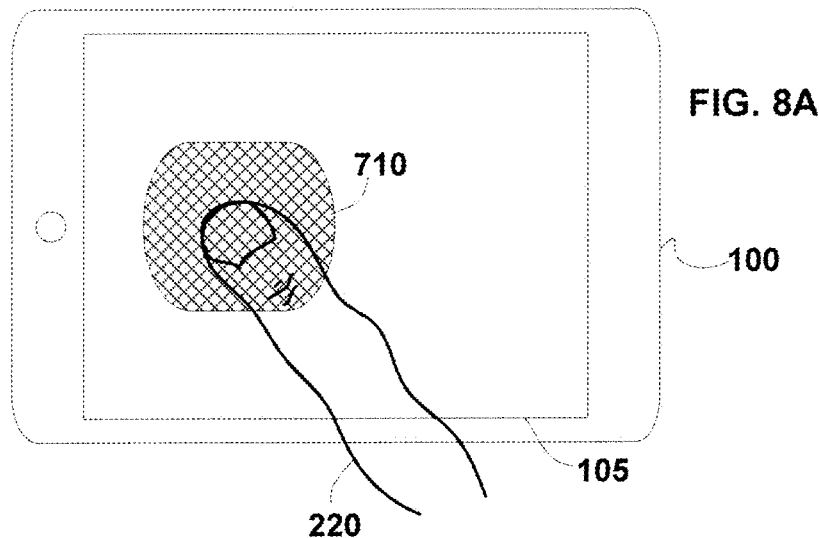
FIGS. 8A-8C illustrate movement of a localized filter, according to various embodiments of the invention.
Figure 8B:
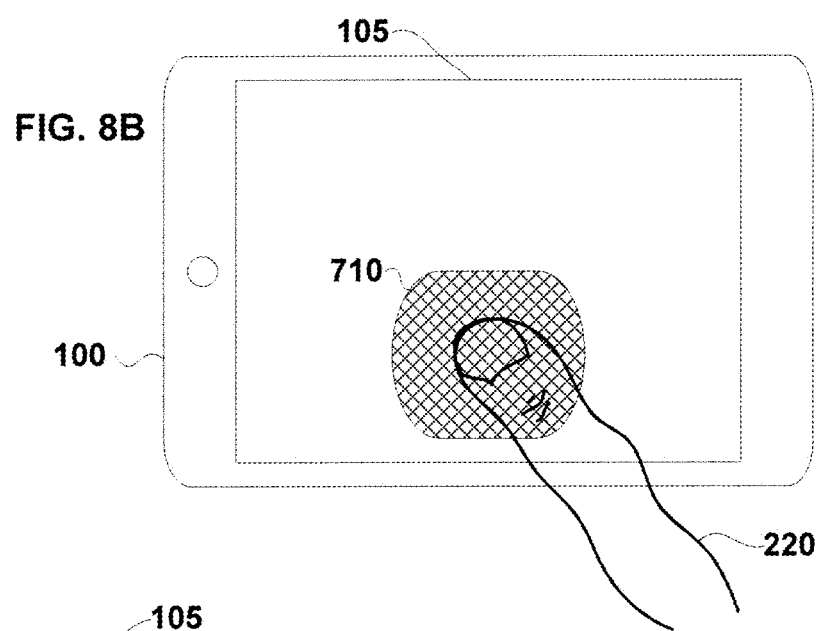
Figure 8C:
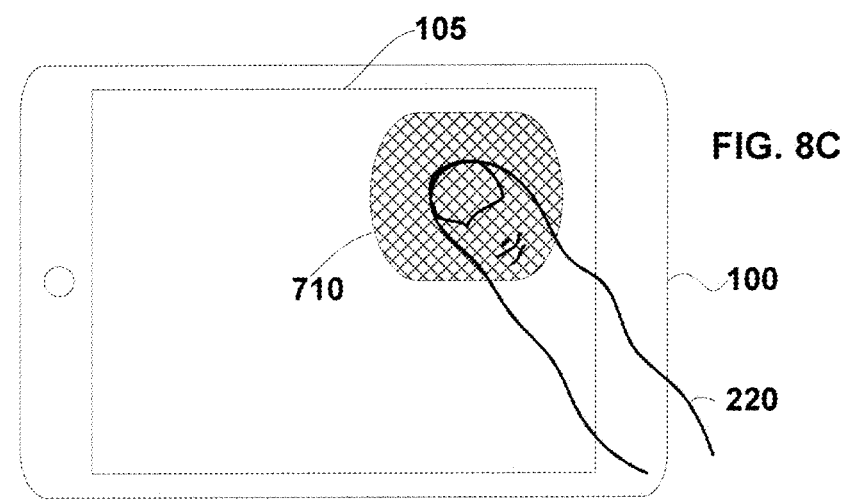

FIGS. 8A-8C illustrate movement of a localized filter according to various embodiments of the invention. In some embodiments, a Localized Filter 710 is intended to cover specific subject matter within an image. When this image is part of a sequence of images that make up a video, the specific subject matter may move as the video is played. In some embodiments, as illustrated in FIGS. 8A-8C, a Localized Filter 710 (or non-localized filter) can be moved by placing Finger 220 on the Localized Filter 710 and then dragging the Localized Filter 710 to different positions over time, as the video is displayed. The specific subject matter can, thus, be filtered at different locations in multiple frames of the video.

FIG. 9 illustrates a method of applying a localized filter to a video segment, according to various embodiments of the invention. This method includes defining a Localized Filter 710 and then moving the location of the defined Localized Filter 710 as different images of the video segment are displayed. After desired filtering is obtained the Localized Filter 710 may be automatically applied to multiple frames of the video in a destructive manner. The steps illustrated in FIG. 9 are optionally performed suing the elements of Video Editing System 100 as described elsewhere herein.

Specifically, in a Display Image Step 910 an image is presented on Display 105, the image typically being part of the sequence of images that make up a video. The image is optionally displayed as a still image. In a Define Local Filter Step 920, a Localized Filter 710 is defined over specific area of the image. If the image is displayed as a still image, the Localized Filter 710 can be defined at a user's leisure. An example of a Localized Filter 710 as may be defined in Define Local Filter Step 920 is illustrated in FIG. 8A. In alternative embodiments, any of the filters discussed herein may be defined in Define Local Filter Step 920 using Selection Logic 125.

In an Advance Sequence Step 930, the image sequence of the video is advanced, e.g., additional images of the video are provided to Display 105 in sequence over time. The images may be displayed at the normal frame rate of the video, or at a reduced frame rate. In some embodiments, the video continues to advance as long as a user applies Finger 220 to the Localized Filter 710.

In an Adjust Local Filter Step 940 the location of the Localized Filter 710 is changed by sliding Finger 220 on Display 220. Adjust Local Filter Step 940 is optionally performed during Advance Sequence Step 930 using Selection Logic 125. As such, the user can keep the Localized Filter 710 over a specific item of interest within the video, even if that item changes position between images (e.g., frames of the video). For example, a user may watch the video as it is presented in slow motion and move their Finger 220 such that the Localized Filter 710 is moved over the item of interest in each image (frame). Such movement is shown in FIGS. 8B and 8C. As each image is shown the Localized Filter 710 is applied to the image in a destructive or non-destructive manner.

In an optional Review Sequence Step 950, the user plays back the video and observers the positions and movement of the Localized Filter 710 as applied to the video. The play back is optionally in slow motion. Review Sequence Step 950 may include providing the user with an option to return to Adjust Local Filter Step 940 wherein the user can adjust the position of Localized Filter 710 in individual frames. This adjustment may be performed using Finger 220 as illustrated in FIGS. 8A-8C.

In an optional Apply Filter Step 960, Localized Filter 710 is destructively applied to images of the video using Filter Logic 120. The Define Local Filter Step 920 or Adjust Local Filter Step 940 is automatically applied to each image at the positions designated in Define Local Filter Step 920 and/or Adjust Local Filter Step 940. This permanently modifies the pixels in the images and, depending on the type of filter, results in an irreversible change to the video. For example, of the filter is configured to blur a specific item of interest in the video then in Apply Filter Step 960 the pixels including this item are irreversibly blurred in multiple images of the video. The locations of the blurring may change between images as specified in Adjust Local Filter Step 940. The filtered video is optionally stored in Memory 115.

Review Sequence Step 950 and Apply Filter Step 960 are optional in, for example, embodiments in which Localized Filter 710 is applied destructively in Define Local Filter Step 920 or Adjust Local Filter Step 940. Steps 920-960 may be repeated to apply a second filter to the video. The second filter may be applied to some of the same images as the first filter.

Computing systems referred to herein can comprise an integrated circuit, a microprocessor, a personal computer, a server, a distributed computing system, a communication device, a network device, or the like, and various combinations of the same. A computing system may also comprise volatile and/or non-volatile memory such as random access memory (RAM), dynamic random access memory (DRAM), static random access memory (SRAM), magnetic media, optical media, nano-media, a hard drive, a compact disk, a digital versatile disc (DVD), and/or other devices configured for storing analog or digital information, such as in a database. The various examples of logic noted above can comprise hardware, firmware, or software stored on a computer-readable medium, or combinations thereof. A computer-readable medium, as used herein, expressly excludes paper. Computer-implemented steps of the methods noted herein can comprise a set of instructions stored on a computer-readable medium that when executed cause the computing system to perform the steps. A computing system programmed to perform particular functions pursuant to instructions from program software is a special purpose computing system for performing those particular functions. Data that is manipulated by a special purpose computing system while performing those particular functions is at least electronically saved in buffers of the computing system, physically changing the special purpose computing system from one state to the next with each change to the stored data.

Several embodiments are specifically illustrated and/or described herein. However, it will be appreciated that modifications and variations are covered by the above teachings and within the scope of the appended claims without departing from the spirit and intended scope thereof. For example, the systems and methods discussed herein may be applied to video received by Video Editing System 100 from an external source. In some embodiments, Filter Logic 120 is configured to apply image overlays, text overlays, audio overlays, image effects and/or textures. These elements may be managed and manipulated in any of ways taught herein for filters. The image effects can include, for example, lens flares, film grain, burned edges, blurred edges, and/or the like. Video Editing System 100 is optionally configured to render images and/or modify rendered images as taught herein. The filters discussed herein may be applied to compressed video. For example, video communicated or stored using P-frames, I-frames and/or B-frames. The logic discussed herein may include hardware, firmware and/or software stored on a computer readable medium. This logic may be implemented in an electronic device to produce a special purpose computing system. Some embodiments of the invention include all or parts of the logic taught herein in the form of software stored on a non-volatile computer readable medium.

The embodiments discussed herein are illustrative of the present invention. As these embodiments of the present invention are described with reference to illustrations, various modifications or adaptations of the methods and or specific structures described may become apparent to those skilled in the art. All such modifications, adaptations, or variations that rely upon the teachings of the present invention, and through which these teachings have advanced the art, are considered to be within the spirit and scope of the present invention. Hence, these descriptions and drawings should not be considered in a limiting sense, as it is understood that the present invention is in no way limited to only the embodiments illustrated.

What is claimed is:
1. A video editing system comprising:
a display including a plurality of pixels;
video representation logic configured to generate a representation of a video segment, the representation being configured for presentation on the display and including a curvilinear object representative of the video segment as a function of time, the curvilinear object being displayed in a two dimensional space;

video selection logic configured to receive a selection of a part of the video segment, the selection being based on positions of a start marker and an end marker on the curvilinear object and resulting in a selected video segment;

video modification logic configured to receive a modification of the selected video segment, the modification being responsive to movement of the curvilinear object within the two dimensional space;

memory configured to store the selected video segment; and a microprocessor configured to execute at least the video modification logic.

2. The system of claim 1, wherein the modification of the selected video segment includes at least one of volume change, filter intensity, video presentation speed and pixel distortion.

3. The system of claim 1, wherein the video modification logic is configured to perform a first type of modification responsive to movement of the curvilinear object along a first axis and to perform a second type of modification responsive to movement of the curvilinear object along a second axis.

4. The system of claim 1, wherein the movement of the curvilinear object includes changing a radius of the curvilinear object.

5. The system of claim 1, further comprising
filter logic configured for applying filtering to a first part of images within the video segment, the filtering configured to change the appearance of displayed pixels, and
selection logic configured to select the first part of the images in response to a sliding touch on the display, such that the filtering is applied to the first part of the images but not a second part of the images, a division between the first part and the second part being controlled in real time as the sliding touch is moved on the display.

6. The system of claim 1, wherein the display further includes a touch sensitive screen, and the video selection logic is further configured to receive the selection of the part of the video segment as touch coordinates received from the touch sensitive screen.

7. The system of claim 1, further comprising a camera responsive to the microprocessor and configured to capture the video segment.

* * * * *